Patented Mar. 9, 1943

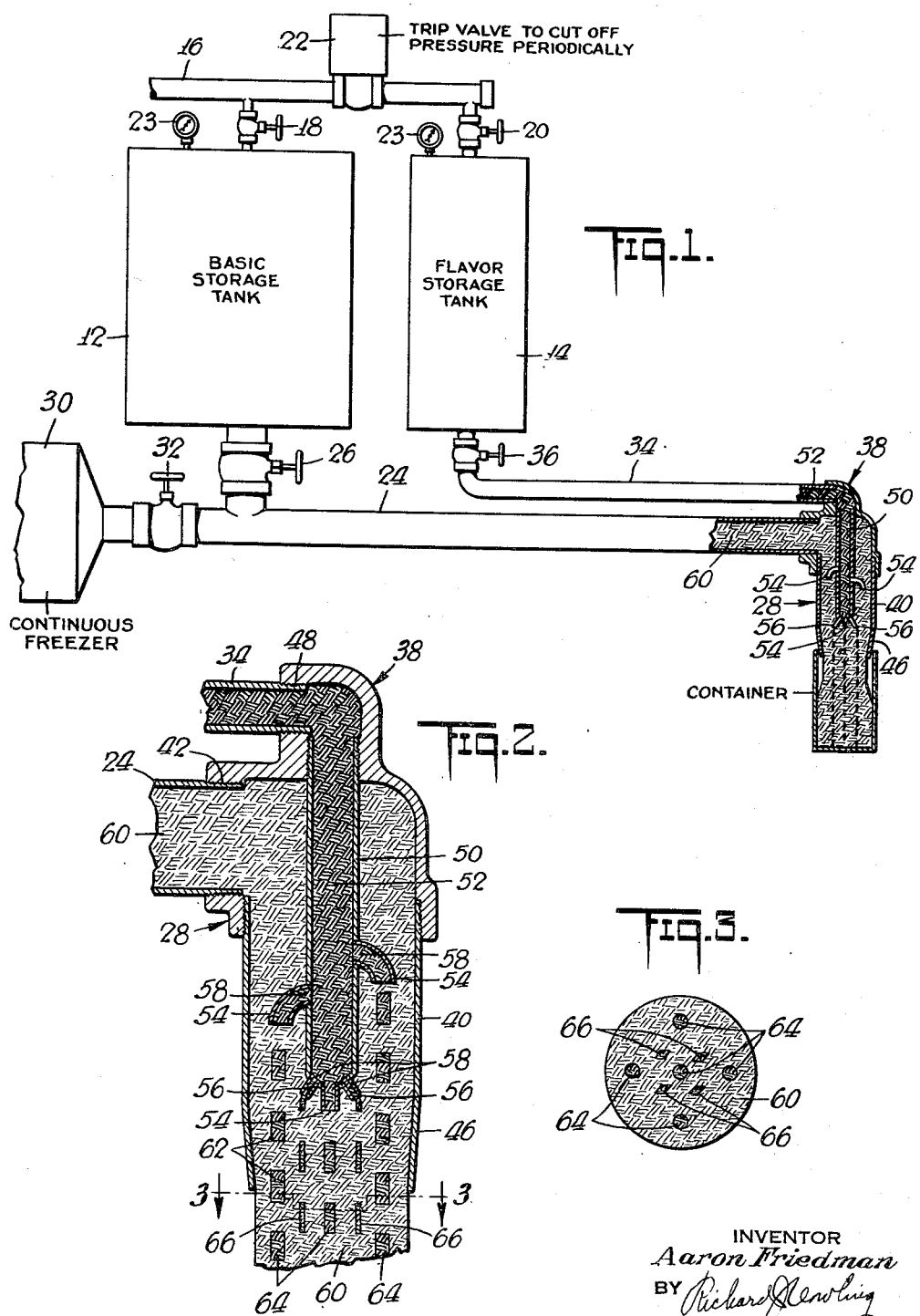

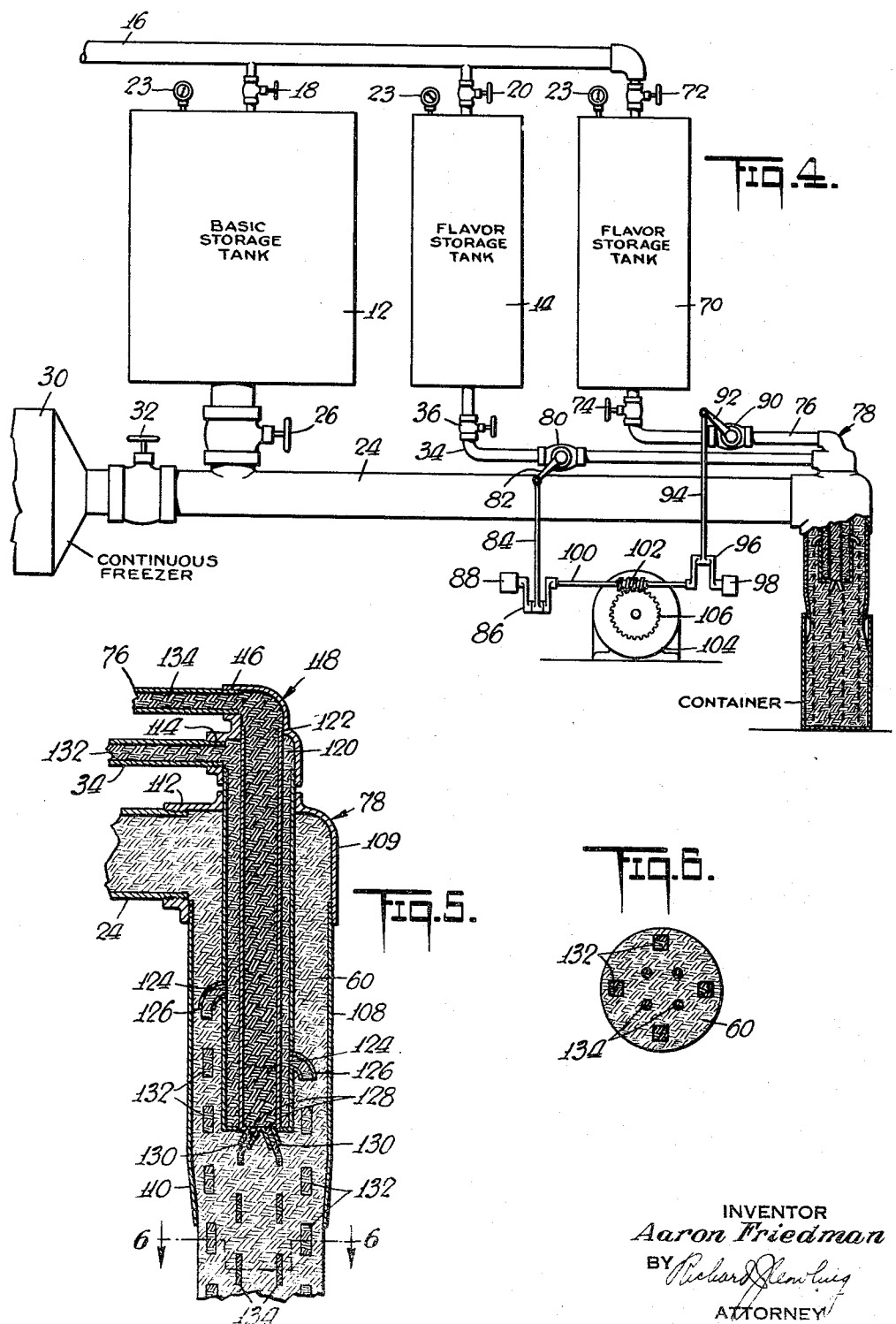

2,313,060

UNITED STATES PATENT OFFICE 2,313,060

APPARATUS FOR MAKING VARIEGATED ICE CREAMS OR SIMILAR SUBSTANCES

Aaron Friedman, New York, N. Y., assignor to Joe Lowe Corporation, New York, N. Y., a corporation of Delaware Original application April 16, 1940, Serial No. 329,914. Divided and this application November 20, 1940, Serial No. 366,387

11 Claims. (Cl. 107—1)

The present invention relates generally to a method of and apparatus for making a frozen edible product, and it has particular relation to the manufacture of bulk or packaged composite substances, such as sherbet, ice milk, ice cream, frozen custard and like substances, which have variegations of a flavoring material of a contrasting color or colors dispersed therein and therethrough.

This application is a division of my co-pending application Serial No. 329,914, filed April 16, 1940.

Heretofore, when such products have been manufactured, the flavoring material has been limited to a single flavor. Also, the flavoring material, in the course of manufacture, has been dispersed in the basic substance in the form of a plurality of continuous strips or ribbons, and then the composite extrusion product has been broken up immediately to prevent the flavoring material, which is generally of much higher density than the basic substance, from separating therefrom before the composite product can be frozen into a form retaining state. This extra step of "breaking up" the continuous strips of flavoring material causes a loss in "over run" in the basic whipped or agitated substance, and is therefore disadvantageous. It also requires an extra and unnecessary breaking-up operation in the manufacture of such products, which I propose to eliminate with my present invention.

An object of the present invention is to provide a new, simple and inexpensive method or process for manufacturing a basic bulk sherbet, ice milk, ice cream, frozen custard or similar substances, having a flavoring material, or a plurality of flavoring materials, of a contrasting color or colors dispersed therein and therethrough to produce a composite frozen edible variegated product of the character described.

Another object of the invention is the provision of a simple, efficient and sanitary method or process for manufacturing a basic bulk sherbet, ice milk, ice cream, frozen custard or similar substances, having a contrasting flavoring material or materials dispersed therein and therethrough to produce a composite frozen edible variegated product of the character described by injecting intermittently said flavoring material into a moving stream of said basic substance.

A further object of the invention is to provide a new and efficient method of injecting or inserting under intermittent pressure spaced portions of a contrasting flavoring material, or materials, into a bulk edible substance of semi-fluid or semi-plastic consistency moving under constant pressure in the form of a stream.

Another object of the invention is to provide a new and efficient method of injecting or inserting under pressure spaced portions of a contrasting flavoring material or materials, into a bulk edible substance of a semi-fluid or semi-plastic consistency moving under pressure in the form of a stream by intermittently injecting said material or materials therein in a plurality of spaced positions.

A further object of the invention is the provision of a new and efficient method of injecting or inserting alternately and also intermittently, a plurality of contrasting flavoring materials into a single bulk edible substance of semi-fluid or semi-plastic consistency moving under constant pressure in the form of a stream.

Another object of the invention is to provide new, simple and inexpensive apparatus suitable for introducing a plurality of spaced portions of a contrasting edible flavoring material into a continuously moving stream of a plastic substance.

A further object of the invention is to provide new, simple, inexpensive and sanitary apparatus for extruding intermittently under pressure a plurality of flavoring materials in a basic substance in a variegated relation through a common extruding nozzle.

Another object of the invention is to provide a simple, efficient and sanitary apparatus for extruding alternately under pressure a plurality of contrasting flavoring materials into a moving continuous stream of plastic substance in relatively small spaced portions each separated from the other portions by said basic substance.

Other and further objects and advantages of the invention reside in the detailed description of the method employed and apparatus used, which result in simplicity, economy and efficiency, and which will be apparent from the following description, wherein several preferred forms of embodiment of the invention are diagrammatically shown, reference being had to the accompanying drawings, forming a part hereof, wherein like numerals indicate like parts, in which:

Fig. 1 is a diagrammatic view partly in section of apparatus suitable for practicing the invention by extruding intermittently a single contrasting flavor into a single basic substance;

Fig. 2 is an enlarged longitudinal sectional view of the extrusion head shown in Fig. 1;

Fig. 3 is a cross-sectional view of the composite extrusion shown in Fig. 2, the same being taken substantially along the line 3—3 thereof, looking in the direction of the arrows;

Fig. 4 is a diagrammatic view, partly in section, of a modified apparatus suitable for practicing the invention by extruding a plurality of contrasting flavors simultaneously and intermittently into a single basic substance;

Fig. 5 is an enlarged longitudinal sectional view of the extrusion head shown in Fig. 4; and Fig. 6 is a cross-sectional view of the composite extrusion in Fig. 5, the same being taken substantially along the line 6—6 thereof, looking in the direction of the arrows.

Referring now to the drawings, and particularly Figures 1 to 3 thereof, there is shown in Fig. 1 a diagrammatic view of the apparatus employed in carrying out my method for making variegated frozen edible products with a single contrasting flavoring material. The apparatus consists of a basic storage tank 12 and a flavoring storage tank 14. A source of air pressure is connected by a pipe line 16 to the top of the tank 12 through a manually operable valve 18, and to the flavoring tank 14 through a manually operable valve 20 of conventional constructions. Mounted in the pipe line 16 between the basic storage tank 12 and flavoring storage tank 14 is a suitable trip valve 22 of any conventional construction which can be set or regulated to open and close the line 16 leading to the tank 14 intermittently or at periodic intervals such as by an electric control (not shown). The tanks 12 and 14 are provided with suitable pressure gauges as indicated at 23.

A relatively large pipe line 24 leads from the bottom of the basic storage tank 12, through a suitable manually operable valve 26 to an extruding head 28. The valve 26 is provided in the line 24 so that the basic storage tank 12 may be cut off from the line 24 and another source of supply for the basic substance, such as a continuous freezer 30, may be substituted, therefor, reaching the line 24 through a suitable valve 32. It will be apparent that when the valve 32 is closed, the continuous freezer 30 is cut off from the line 24. The basic storage tank 12 is provided for operation when a conventional batch type ice cream freezer (not shown) is employed for making the basic substance, and the output of the batch freezer may be introduced into the tank 12 when its pressure is cut off by means of the valve 18 through a suitable trap door or pipe line (not shown). In this construction, it will be readily apparent that either source of supply may be utilized for delivery of the basic substance by merely opening its respective valve connection, and that source of supply not being utilized may be cut off by closing its respective valve connection.

A relatively small pipe line 34 leads from the bottom of the flavoring tank 14 through a suitable manually operable valve 36 to an injecting nozzle 38 mounted within the extruding head 28 and thereby provides suitable means for delivery of the flavoring material to said head 28 for injection into the basic substance passing therethrough.

The extruding head 28, as best shown in Fig. 2, consists of an elongated hollow tubular member 40 having a relatively large lateral opening 42 adjacent its receiving end for receiving the basic edible substance under pressure from the storage tank 12, or continuous freezer 30, whichever side is in open communication with the line 24. The discharging end of the member 40 is deflected inwardly, as indicated at 46, to exert a squeezing pressure on the composite extrusion to facilitate closing up any internal air holes or pockets therein so that the composite extrusion will be substantially solid throughout.

The extrusion head 28 is provided also with a relatively small lateral opening 48 adjacent its receiving end for receiving an elongated injection nozzle 50, having a closed discharging chamber 52 provided with a plurality of outwardly extending tubular injecting tubes 54 of circular cross-section spaced longitudinally thereover, and a plurality of outwardly extending tubular injecting tubes 56 of square cross-sectional shape projecting radially from its forward closed rounded end. The injecting tubes 54 and 56 are in open communication with the discharging chamber 52 through suitable openings 58, and are of varying sizes.

In operation of the apparatus shown in Figures 1 to 3, it will be assumed that the basic substance 60 is being supplied from the storage tank 12, the valve 26 being open to the pipe line 24 and the valve 32 leading to the continuous freezer 30 being closed. A constant air pressure is supplied to the basic storage tank 12 through the pipe line 16 and valve 18. Air pressure is supplied intermittently from the pipe line 16 and valve 20 to the flavoring storage tank 14 because of the periodic or intermittent operations of the trip valve mechanism 22. The period of operation, of course, being set at predetermined intervals, depending upon the nature of the composite product desired to be produced, and the proportions of flavoring material 62 desired to be introduced into the basic substance 60. Any conventional mechanism suitable of effecting such a control will be satisfactory for use in the system, such as a mechanically operated trip valve or an electrically controlled time valve opening and closing mechanism. The basic substance 60 is forced by air pressure in the tank 12 through the open valve 26 into the pipe line 24 to the extruding head 28, where it enters through the port 42 into the hollow tubular chamber 40, passing on all sides of the discharging chamber 52 of the flavoring nozzle 50 concentrically mounted therein, and being extruded out of its discharging end 46, which is slightly smaller in cross-sectional dimensions than its main chamber 40. This reduction in size causes pressure to be exerted on the composite extrusion product inwardly, thereby causing the substances to fill up any air holes that may have been formed therein by the chamber 52 of the flavoring nozzle or its injecting tubes 54 and 56. It will be apparent that a continuous extrusion of the basic substance 60 will be effected as long as pressure is maintained on the tank 12. It will also be apparent that when the continuous freezer 30 is utilized as the source of the basic substance, no outside source of pressure will be required for extruding the basic substance 60, as such a machine has sufficient pressure of its own to force the basic substance 60 through the pipe line 24 and extrusion head 28.

The flavoring material 62, stored in the tank 14, is forced by its air pressure through the valve 36 into the pipe line 34 connected to the port 48 of the extruding head 28. Upon entering the port 48 the flavoring material 62 passes into the discharging chamber 52, and is thereupon forced therefrom through the openings 58 and into the injecting tubes 54 and 56. Each time pressure is exerted upon the flavoring material 62 in the tank 14, it is forced out of the tubes 54 and 56 into the moving stream of plastic basic substance 60, and each time the pressure is taken off the tank 14, the delivery of the flavoring material 62 is stopped. By regulating the control valve mechanism 22 to certain predetermined time intervals, corresponding predetermined lengths of portions of flavoring material 62 may be intermittently injected into the basic substance 60, as best shown in Fig. 2. These intermittent portions or "shots" of flavoring material 62 will assume the cross-sectional shape of the injecting tubes. For example, the injecting tubes 54 are of circular cross-sectional shape, and its respective deliveries 64 are of corresponding shape, as best shown in Fig. 3. Likewise, the injecting tubes 56, which are of square cross-sectional shape, will deliver square shaped portions 66. By making the cross-sectional dimensions of the extruding head 28 of substantially the size of a conventional pint or quart brick, it is possible to extrude the composite product directly into such containers, as shown in Fig. 1, thereby eliminating repacking from larger containers at the place of retail sale. The composite extrusion is sufficiently plastic to be cut transversely adjacent the end of the extrusion head by merely manually moving the container across its discharging end, and therefore no cutting-off mechanism is required to cut the composite extrusion when each carton is filled.

In the modified apparatus shown in Figures 4 to 6, I propose to inject a plurality of contrasting flavoring materials into the basic substance. To effect such an operation, a third supply tank 70 is provided for the additional flavor, and a different form of extrusion head is required. While the pressure operating mechanism for causing extrusion may be identical to that shown in Figures 1 to 3, I have in this modified form of apparatus disclosed, a constant source of pressure and an entirely different manner of causing intermittent extrusion of the flavoring materials by connecting mechanically operated trip valves into the flavoring pipe lines intermediate the supply tanks and the extrusion head.

The new flavoring tank 70 is connected at the top of the air line 16 through a suitable manually operable valve 72. An outlet valve 74 is connected to the bottom of the tank 72 and leads to a pipe line 76 which in turn is connected to an extruding head 78.

In the line 34, leading from the flavoring tank 14 to the extruding head 78, I propose to mount a suitable mechanically operated trip valve mechanism 80, having a projecting control lever 82, which in turn is connected by a link 84 to a crank shaft 86, having its outer free end suitably journaled in bearing block 88. Likewise, intermediate the ends of the flavoring line 76 a corresponding trip valve mechanism 90 is mounted, which is provided with a projecting control lever 92, which in turn is connected by a link 94 to a crank shaft 96, having its outer free end suitably journaled in bearing block 98. The inner ends of the crank shafts 86 and 96 are connected to a drive shaft 100, having a worm wheel 102 mounted thereon. A motor 104, having a built in reduction gear provided with suitable worm driving gear 106 is mounted in driving relation to the worm wheel 102 so that when the motor 104 is operating the worm driving gear 106, it will cause rotation of the drive shaft 100, which in turn operates the crank shafts 86 and 96, causing, through the levers 82 and 92, opening and closing of the trip valves 80 and 90 respectively. It will be noted that the crank shafts 86 and 96 are mounted on the drive shafts 100 at an angle of 180 to each other, which arrangement causes the valve 80 to be opened when the valve 90 is closed, and vice versa.

The extruding head 78, as best shown in Fig. 5, consists of an elongated hollow tubular member 108 having a discharging chamber 109 and a reduced open discharging end 110. The head 78 is provided with a relatively large lateral port opening 112 adjacent its receiving end for receiving a basic edible substance 60 under pressure from the pipe line 24. The extrusion head 78 is also provided with a relatively small lateral port opening 114 for the pipe line 34 and a second relatively small lateral opening 116 for the pipe line 76. An elongated ejecting nozzle 118 is mounted internally in the extruding head 78 in spaced relation therewith, and is provided with an outer separate compartment 120 and an inner separate compartment 122. The outer compartment 120 is in open communication to the port 114, and the inner compartment 122 is in open communication with the port 116. The outer compartment 120 is provided with a series of openings 124 into which are mounted injecting tubes 126. The inner compartment 122 has a series of openings 128 at its forward or discharging end into which are mounted injecting tubes 130. The injecting tubes 126 are shown to be of circular cross-sectional shape, and the injecting tubes 130 are of a square cross-sectional shape, but it is to be understood that these tubes may be of any desired shape or shapes without departing from the spirit of my invention.

In operation of the apparatus disclosed in Figs. 4 to 6, it will be assumed that constant pressure is being supplied to all of the storage tanks 12, 14 and 70, which will cause their respective materials to be forced through the pipe lines 24, 34 and 76, respectively, into the common extruding head 78. By operating the motor 104, the trip valves 80 and 90 as previously explained will alternately open and close, permitting alternate deliveries of their respective flavoring materials. The basic substance 60 will pass through the pipe line 24 into discharging chamber 109, surrounding the injection nozzle 118, and pass out through the open discharging end 110. The contrasting flavoring material 132 coming from the storage tank 14 through the pipe line 34 enters the extrusion head 78 through the port 114 into the discharging chamber 120, which encircles the chamber 122, and out through the ports 124 and injecting tubes 126. The second flavoring material 134, which is desirably of a contrasting color to the basic substance 60 and first flavoring material 132, is kept in the storage tank 70. It passes through the pipe line 76, enters the extrusion head 78 through the port 116, and thereupon passes into the inner compartment 122. It is expressed by pressure from the compartment 122 through the ports 128 and injecting tubes 130. As shown in Fig. 6, the shape of the extrusion 132 and 134 are identical to the shapes of their corresponding injecting tubes 126 and 130. Since the trip valves 80 and 90 are alternately opening and closing it will be obvious that their respective flavoring materials 132 and 134 will be fed intermittently into the basic substance 60 and will be alternately spaced therein, as best shown in Fig. 2. If, however, the different flavoring materials 132 and 134 are desired to be injected simultaneously instead of alternately, it is merely necessary to change the valve operating mechanism to open and close the valves 80 and 90 accordingly. These changes are believed to be well within the knowledge of any skilled mechanic, and therefore no detailed explanation need be made herein.

It will be apparent from the operations of the above described apparatus that I have provided several methods of making a variegated product, and that various other methods may be practiced with the same apparatus. For example, a continuous strip of flavoring material, or materials, may be introduced into the basic substance by merely cutting out the operation of my several timing or trip valve mechanisms. Also, the same flavoring material may be placed in both storage tanks 14 and 70 of Fig. 4, if more material of a single flavor is desired with respect to the basic substance 60 than can be delivered with the apparatus shown in Figures 1 to 3.

Although I have only described in detail several of the modifications which the invention may assume, it will be readily apparent to those skilled in the art that the same is not so limited, but that various other modifications may be made therein without departing from the spirit thereof or from the scope of the appended claims.

What I claim is:

1. Apparatus for making a variegated composite edible product consisting of a source of pressure for delivering intermittently a contrasting flavoring material from a supply tank to an elongated extrusion head through which is passing under constant pressure a continuous stream of semi-plastic substance, said extrusion head containing an elongated nozzle concentrically mounted therein for delivering a plurality of spaced streams of spaced portions of flavoring material throughout said continuous stream of basic substance, said extrusion head having a constriction adjacent its delivery end for compressing said combined substances as the same is discharged therefrom.

2. Apparatus for making a variegated composite edible product consisting of a source of intermittent pressure for delivering a contrasting flavoring material from a supply tank to an elongated extrusion head through which is passing under constant pressure a continuous stream of semi-plastic substance, said extrusion head containing an elongated nozzle concentrically mounted therein for delivering a plurality of spaced streams of spaced portions of flavoring material of different shapes throughout said stream of basic substance.

3. Apparatus for making a variegated composite edible product consisting of a constant source of pressure for delivering contrasting flavoring materials from separate supply tanks to an elongated extrusion head through which is passing under constant pressure a stream of semi-plastic substance, means mounted in said supply lines for causing said flavoring material to be ejected intermittently from the extrusion head, said extrusion head containing an elongated flavoring nozzle concentrically mounted therein, said flavoring nozzle having a plurality of separate compartments for receiving a plurality of flavoring materials, and means projecting from said compartments for delivering said intermittent ejections of flavoring material in a plurality of spaced streams throughout said stream of basic substance.

4. Apparatus for making a variegated composite edible product consisting of a source of pressure for delivering contrasting flavoring materials from separate supply tanks to an elongated extrusion head through which is passing under constant pressure a stream of semi-plastic substance, means mounted between said supply tanks and said extrusion head for causing said flavoring material to be ejected from said head in spaced relatively short portions, said extrusion head containing an elongated flavoring nozzle having a plurality of separate compartments for receiving a plurality of flavoring materials, and means, including a plurality of spaced injecting tubes, connected with said compartments for delivering said relatively short portions of flavoring materials in a plurality of spaced streams throughout said stream of basic substance.

5. Apparatus for making a variegated composite edible product consisting of a source of pressure for delivering contrasting flavoring materials from separate supply tanks to an elongated extrusion head through which is passing under constant pressure a continuous stream of semi-plastic substance, means mounted in said supply lines for causing intermittent ejections of each of said flavoring materials alternately from said extruding head, said extrusion head containing an elongated flavoring nozzle having a plurality of separate compartments for receiving a plurality of flavoring materials, and a plurality of injecting tubes extending from each of said compartments for delivering said ejectments flavoring materials in a plurality of spaced positions throughout said stream of basic substance.

6. Apparatus for making a variegated composite edible product consisting of a source of pressure for delivering contrasting flavoring materials from separate supply tanks through separate supply lines to an elongated extrusion head through which is passing under constant pressure a continuous stream of semi-plastic substance, separate means mounted in said supply lines operated from a common source for causing intermittent and alternate injections from said extruding head of said flavoring materials, said extrusion head containing an elongated flavoring nozzle having a plurality of separate compartments for receiving a plurality of flavoring materials, and a plurality of injecting tubes extending from each of said compartments for delivering said flavoring materials in a plurality of spaced positions throughout said stream of basic substance.

7. Apparatus for making a variegated composite edible product consisting of a constant source of pressure for causing a continuous stream of basic substance to be extruded through an extruding head, an intermittent source of pressure for delivering a contrasting flavoring material from a supply tank to said extruding head, said extruding head containing a nozzle for injecting a plurality of spaced streams of spaced portions of flavoring material throughout said basic substance when said source of pressure is connected to said supply tank.

8. Apparatus for making a variegated composite edible product consisting of a constant source of pressure for causing a continuous stream of basic substance to be extruded through an extruding head, a source of pressure for delivering a contrasting flavoring material from a supply tank to said extruding head, said extruding head containing a nozzle for injecting said flavoring material into said basic substance in a plurality of spaced positions and means for regulating the pressure in said flavoring tank to cause intermittent injection of said flavoring material into said basic substance in relatively short spaced portions.

9. Apparatus for making a variegated composite edible product consisting of a constant source of pressure for causing a continuous stream of basic substance to be extruded through an extruding head, a constant source of pressure for delivering a contrasting flavoring material from a supply tank to said extruding head, said extruding head containing a nozzle for injecting said flavoring material in a plurality of spaced positions throughout said basic substance, and means connected in the line leading from the flavoring supply tank to said nozzle in said extruding head for controlling the flow of flavoring material from said nozzle whereby said flavoring material is ejected intermittently in relatively short spaced portions.

10. Apparatus for making a variegated composite edible product consisting of a source of pressure for causing a continuous stream of basic substance to be extruded through an extruding head, a source of pressure for causing the delivery of a plurality of contrasting flavoring materials from their respective supply tanks to said extruding head, said extruding head containing a nozzle for injecting a plurality of said streams of a plurality of flavoring materials in spaced relation throughout said basic substance, and means for alternating the delivery of said flavoring materials from said injecting nozzles.

11. Apparatus for making a variegated composite edible product consisting of a source of pressure for causing a continuous stream of basic substance to be extruded through an extruding head, a source of pressure for causing the delivery of a plurality of contrasting flavoring materials from their respective supply tanks to said extruding head, said extruding head containing a nozzle for injecting a plurality of said streams of a plurality of flavoring materials in spaced relation throughout said basic substance, and valve operating means mounted in the supply lines to said nozzle for alternating the delivery of said flavoring materials from said injecting nozzles.

AARON FRIEDMAN.